(12) United States Patent
Conrad et al.

(10) Patent No.: US 9,010,852 B1
(45) Date of Patent: Apr. 21, 2015

(54) IN-ARM MONITOR SEAT

(71) Applicant: TIMCO Aviation Services, Inc., Greensboro, NC (US)

(72) Inventors: David Conrad, Greensboro, NC (US); Jeffrey S. Everhart, Winston-Salem, NC (US)

(73) Assignee: TIMCO Aviation Services, Greensboro, NC (US)

( * ) Notice: Subject to any disclaimer, the term of this patent is extended or adjusted under 35 U.S.C. 154(b) by 149 days.

(21) Appl. No.: 13/718,033

(22) Filed: Dec. 18, 2012

Related U.S. Application Data

(60) Provisional application No. 61/577,169, filed on Dec. 19, 2011.

(51) Int. Cl.
| | |
|---|---|
| *B60N 2/46* | (2006.01) |
| *B60R 11/02* | (2006.01) |
| *B60N 3/00* | (2006.01) |
| *B60R 7/00* | (2006.01) |

(52) U.S. Cl.
CPC ............ *B60R 11/0229* (2013.01); *B60N 3/002* (2013.01); *B60R 7/00* (2013.01); *B60N 2/468* (2013.01)

(58) Field of Classification Search
CPC ............... B60R 11/0235; B60R 2011/0014; B60R 2011/0082; B60R 2011/0085; B60N 2/468
USPC ........ 297/217.3, 188.16, 188.17, 188.19, 145
See application file for complete search history.

(56) References Cited

U.S. PATENT DOCUMENTS

| | | | | |
|---|---|---|---|---|
| 5,179,447 | A * | 1/1993 | Lain ............................ | 348/837 |
| 5,195,709 | A * | 3/1993 | Yasushi .................... | 248/280.11 |
| 5,374,104 | A * | 12/1994 | Moore et al. ............. | 297/188.16 |
| 5,547,248 | A * | 8/1996 | Marechal ................. | 297/188.17 |
| 5,564,667 | A * | 10/1996 | Copeland et al. .......... | 248/278.1 |
| 5,996,954 | A * | 12/1999 | Rosen et al. ............... | 248/278.1 |
| 6,007,036 | A * | 12/1999 | Rosen ......................... | 248/286.1 |
| 6,427,957 | B1 * | 8/2002 | Finneman et al. ......... | 248/185.1 |
| 6,663,155 | B1 * | 12/2003 | Malone et al. .............. | 296/37.8 |
| 6,746,065 | B1 | 6/2004 | Chan ........................... | 296/24.1 |
| 6,926,329 | B2 | 8/2005 | Neumann et al. .......... | 296/24.34 |
| 6,997,508 | B2 * | 2/2006 | Jaaska, Sr. ............... | 297/188.15 |
| 7,114,755 | B1 | 10/2006 | Sturt et al. ................. | 296/24.34 |
| 7,182,402 | B1 * | 2/2007 | Ahad ........................ | 297/362.13 |
| 7,607,727 | B2 * | 10/2009 | Park ......................... | 297/188.19 |
| 8,234,752 | B2 * | 8/2012 | Anderson ....................... | 16/239 |
| 2002/0163215 | A1 * | 11/2002 | Emerling et al. ............ | 296/24.1 |
| 2006/0219857 | A1 * | 10/2006 | Satterfield ................. | 248/284.1 |

OTHER PUBLICATIONS

Literature from Ace, World leader in declaration technology, Rotary Dampers , Timco Aviation Services, 5 pgs. Nov. 30, 2011.

* cited by examiner

*Primary Examiner* — David R Dunn
*Assistant Examiner* — Jody Giacoman
(74) *Attorney, Agent, or Firm* — MacCord Mason PLLC

(57) ABSTRACT

An in-arm monitor seat. In one embodiment, the device comprises an aircraft passenger monitor apparatus that includes a seat assembly having an armrest and a monitor presenter. The monitor presenter may include a lift latch and a rotational dampener that is configured to present a monitor from the armrest. The result is a device, system and method that provides an improved monitor presentation that is convenient, efficient and safe for the user, particularly when used in the armrest of an aircraft passenger seat.

27 Claims, 12 Drawing Sheets

IN-ARM MONITOR SEAT

This application is based on and claims priority to U.S. Provisional Patent Application No. 61/577,169, filed Dec. 19, 2011, the teachings of which are hereby incorporated by reference in its entirety.

BACKGROUND

1. Field

The present inventions relate generally to monitor displays and, more particularly, to an improved in-arm monitor display presentation for an aircraft passenger seat.

2. Related Art

Monitor displays have been used in vehicles such as aircrafts, automobiles, trains and the like for both entertainment purposes and to provide information to the passengers. It is advantageous to have a mounting system to allow a monitor to be viewed when in use, but stowed or similarly secured when not in use. For instance, it may be advantageous to reposition a monitor from a non-functional stored position to an in-use, functional position.

Instruments have been developed to help reposition the monitor from a storage position to an in-use position. However, such traditional instruments often present safety, convenience and weight concerns, particular with regard to the transition of a monitor from a closed storage position to the in-use position in an aircraft.

Therefore, Applicants desire apparatus, systems and methods for in-arm monitor seats without the drawbacks presented by the traditional systems and methods.

SUMMARY

In accordance with the present inventions, an in-arm monitor seat is provided for vehicles and for aircraft passenger vehicles in particular. These inventions provide an improved monitor display that is convenient, efficient and safe for the user, particularly when used in the armrest of an aircraft passenger seat.

In one embodiment, in an aircraft seat having an armrest, a monitor presenter may include a lift latch and a rotational dampener that is adapted to present a monitor from the armrest. The lift latch may include a handle. Further, the handle may be an ergonomic handle on a top surface of the armrest. The handle may be adapted to present the monitor with a single uninterrupted motion. The monitor presenter may include a latch cavity, for instance wherein the lift latch may be adapted to swivel into the latch cavity in a presented position. A latch spring may be adapted to secure the lift latch in the latch cavity in a way that the lift latch is substantially out of view in the presented position.

The rotational dampener may include at least one dampener body, for instance one that is chosen from a left rotational dampener, a right rotational dampener and a combination thereof. Typically, the rotational dampener is adapted to present the monitor from the armrest at a slow release delay. The slow release delay of presenting the monitor from the armrest may be a function of dampener frictional selection and/or spring assembly selection. The rotational dampener may include a dampener retainer hole to mate the rotational dampener and a side plate. The rotational dampener may include a dampener retainer fastener.

In other examples, the monitor presenter has a plate assembly. The plate assembly may include at least one side plate. Additionally, the plate assembly may include a pair of side plates. The side plate may include a locking plate lip. Further, the side plate may also include at least one locking plate, or a pair of locking plates. Typically, the at least one locking plate includes locking plate holes and locking plate lugs. Further, the at least one locking plate may be a floating locking plate. The side plate may include rivet holes and rivets. The side plate may also include a dampener cavity. A shaft sheath may be positioned within the dampener cavity. Additionally, a ball bearing may be positioned within the dampener cavity.

The monitor presenter may have a support body. The support body may include at least one pin opening. Typically, a pin may protrude through the at least one-pin opening. The support body may include a shaft cavity. A shaft may protrude through the shaft cavity. The support body may include neck assembly holes. The support body may include neck assembly fasteners. The support body may include a spring plunger.

In other examples, the monitor presenter may have a spacer assembly. The spacer assembly may include a spacer sleeve. The spacer assembly may include a spacer fastener.

In yet additional examples, the monitor presenter may have a neck assembly. The neck assembly may include a support end. The neck assembly may further include a neck that is adapted to extend the monitor from the armrest. The neck may be chosen from a circular shaft, a non-circular shaft and combination thereof. The neck assembly may include a distal end. The distal end may include an adapter. The adapter may include a socket hole. Further, the apparatus may include socket fasteners. The distal end may include a shaft sheath. The aircraft seat may include a headrest, seat back, lumbar support, life vest pouch, a literature box, and a baggage bar, or other aircraft feature. The armrest typically includes an upper armrest surface. The upper armrest surface may include a removable top. The upper armrest surface may include controls. The controls may include a seat adjustment control, a monitor presenter control, other aircraft feature controls and combinations thereof. Typically, the armrest includes a storage cavity that is adapted to conceal and store the monitor presenter.

In yet another embodiment, the aircraft passenger monitor apparatus may have a seat assembly having an armrest and a monitor presenter. Typically, the monitor presenter is adapted to present a monitor from the armrest, for instance at a slow-release delay presentation. Often, the upper arm assembly is adapted to rotate the monitor from a storage position within the armrest to a presentation position. In some examples, the presentation position is substantially parallel to the seat assembly. The upper arm assembly may include a monitor support body. The monitor support body may include fasteners to secure the monitor to the monitor support body. Further, the monitor support body may include an elbow having a plurality of monitor viewing angle alignment holes.

In particular examples, the upper arm assembly has a mating end that is adapted to mate with the monitor presenter. The upper arm assembly may include a limiter swivel retainer. The limiter swivel retainer may include a socket. The limiter swivel retainer may include a fastener to fasten the socket and the monitor support. Further, the limiter swivel retainer may include a retainer hat. The retainer hat may include an upper arm hole. The upper arm fastener may fasten the retainer hat and the upper arm assembly.

In another embodiment, an aircraft passenger monitor apparatus includes a seat assembly having an armrest; a monitor presenter that is adapted to present a monitor from the armrest, the monitor presenter may include a lift latch, and a rotational dampener; and an upper arm assembly that is adapted to rotate the monitor from a storage position within the armrest to a presentation position.

Typically, the presentation position is substantially parallel to the seat assembly. The upper arm assembly may include a monitor support body. The monitor support body may include fasteners to secure the monitor to the monitor support body. The monitor support body may include an elbow having a plurality of monitor viewing angle alignment holes. The upper arm assembly may include a mating end that is adapted to mate with the monitor presenter. The upper arm assembly may include a limiter swivel retainer. The limiter swivel retainer may include a socket. The limiter swivel retainer may include a fastener to fasten the socket and the monitor support. The limiter swivel retainer may further include a retainer hat. The retainer hat may include an upper arm hole. An upper arm may have a fastener to generally fasten the retainer hat and the upper arm assembly.

In some examples, the lift latch may include a handle. Further, the handle may be an ergonomic handle on a top surface of the armrest. The handle may be adapted to present the monitor with a single uninterrupted motion. The monitor presenter may include a latch cavity, for instance wherein the lift latch may be adapted to swivel into the latch cavity in a presented position. A latch spring may be adapted to secure the lift latch in the latch cavity in such a way that the lift latch is substantially out of view in the presented position.

The rotational dampener may include at least one dampener body, for instance one that is chosen from a left rotational dampener, a right rotational dampener and a combination thereof. Typically, the rotational dampener is adapted to present the monitor from the armrest at a slow release delay. The slow release delay of presenting the monitor from the armrest may be a function of dampener frictional selection and/or spring assembly selection. The rotational dampener may include a dampener retainer hole to mate the rotational dampener and a side plate. The rotational dampener may include a dampener retainer fastener.

In other examples, the monitor presenter has a plate assembly. The plate assembly may include at least one side plate. Additionally, the plate assembly may include a pair of side plates. The side plate may include a locking plate lip. Further, the side plate may also include at least one locking plate, or a pair of locking plates. Typically, the at least one locking plate includes locking plate holes and locking plate lugs. Further, the at least one locking plate may be a floating locking plate. The side plate may include rivet holes and rivets. The side plate may also include a dampener cavity. A shaft sheath may be positioned within the dampener cavity. Additionally, a ball bearing may be positioned within the dampener cavity.

The monitor presenter may have a support body. The support body may include at least one pin opening. Typically, a pin may protrude through the at least one pin opening. The support body may include a shaft cavity. A shaft may protrude through the shaft cavity. The support body may include neck assembly holes. The support body may include neck assembly fasteners. The support body may include a spring plunger.

In other examples, the monitor presenter may have a spacer assembly. The spacer assembly may include a spacer sleeve. The spacer assembly may include a spacer fastener.

In yet additional examples, the monitor presenter may have a neck assembly. The neck assembly presenter may include a support end. The neck assembly may include a neck adapted to extend the monitor from the armrest. The neck may be chosen from a circular shaft, a non-circular shaft and combination thereof. The neck assembly may include a distal end. The distal end may include an adapter. The adapter may include a socket hole. Further, the apparatus may include socket fasteners. The distal end may include a shaft sheath. The aircraft seat may include a head rest, seat back, lumbar support, life vest pouch, a literature box, and a baggage bar, or other aircraft feature. The armrest includes an upper armrest surface. The upper armrest surface may include a removable top. The upper armrest surface may include controls. The controls may include a seat adjustment control, a monitor presenter control, other aircraft feature controls and a combination thereof. Typically, the armrest includes a storage cavity that is adapted to conceal and store the monitor presenter.

Another embodiment includes a kit for an aircraft monitor apparatus. The kit may include a lift latch and/or a rotational dampener. The kit may also include a monitor and/or fasteners for securing the monitor. Typically, the kit includes a monitor presenter that is adapted to present the monitor. The kit may also include an upper arm assembly for supporting the monitor. In yet additional examples, the kit may include a monitor, such as a video monitor or the like.

The above summary was intended to summarize certain embodiments of the present inventions. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the inventions will be better understood by a reading of the Description of Embodiments along with a review of the drawings, in which.

DESCRIPTION OF EMBODIMENTS

Figure 1:
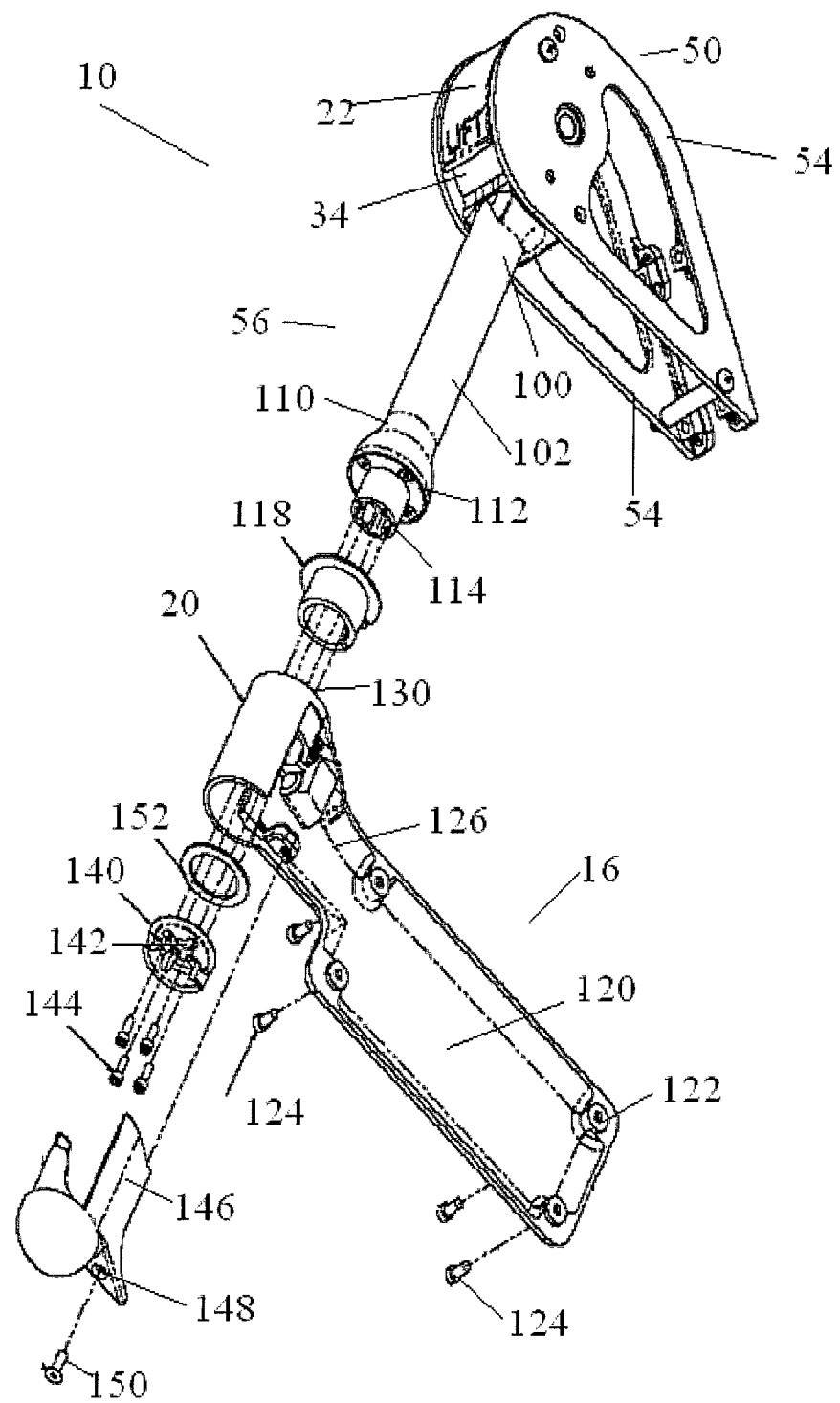
FIG. 1 is a partially exploded perspective view of an aircraft passenger monitor apparatus constructed according to an embodiment of the inventions, with elements removed to show internal components.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 9:
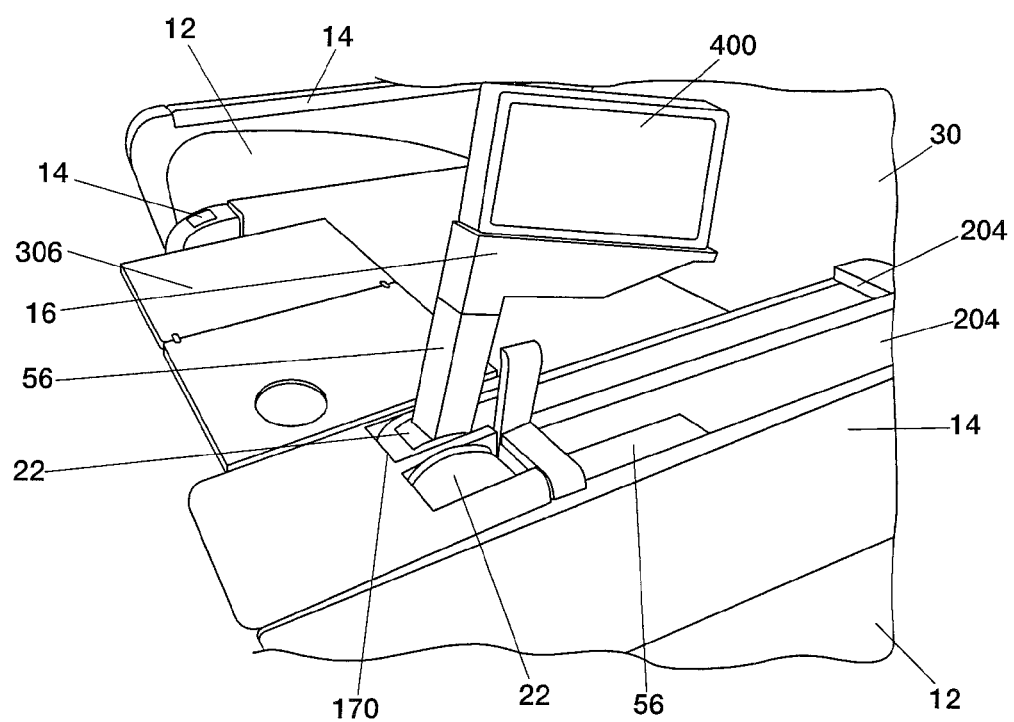
FIG. 9 is a side overview perspective of a seat assembly and aircraft passenger monitor apparatus that is partially presented according to one embodiment of the inventions.

Referring now to the drawings in general and FIG. 1 in particular, it will be understood that the illustrations are for the purpose of describing embodiments of the inventions and are not intended to limit the disclosure or any invention thereto. As best seen in FIGS. 1 and 9, an in-arm monitor seat 10 is shown embodied according to the present inventions. Typically, in-arm monitor seat 10 is an aircraft passenger convenience apparatus and may include seat assembly 12 having an armrest 14 and a monitor presenter. The monitor presenter includes lift latch 22 to control rotational dampener 24 to release upper arm assembly 16 from a stowed position within armrest 14, and rotate upper arm assembly 16 into a presentation position. In particular embodiments, rotational dampener 24 presents upper arm assembly 16 at a slow-release delay, for instance in a single uninterrupted motion for the ergonomic convenience and safety of the user. The monitor presenter thereby stows and presents a monitor 400, or the like, from the in-arm monitor seat 10 as described hereinafter.

FIG. 1 illustrates one embodiment of in-arm monitor seat 10 having a plate assembly 50, a neck assembly 56 and an upper arm assembly 16. Typically, plate assembly 50 includes at least one side plate 54; however, other examples include a pair of opposing side plates 54. As illustrated, lift latch 22 is positioned on the upper face of plate assembly 50 so that lift latch 22 is accessible from seat assembly 12. Typically, lift latch 22 includes handle 34, which may be an ergonomic handle to allow a user to release the monitor presenter assembly from armrest 14 in a single uninterrupted motion. In particular examples, handle 34 is aligned on the distal end of armrest 14 to release the monitor presenter with only a few fingers, for example without disrupting a food tray, grasping across a difficult angle, reaching across an inconvenient expanse while seated in an aircraft passenger seat or the like.

FIG. 1 further introduces particular embodiments of neck assembly 56, which include a support end 100 that is generally supported by plate assembly 50 and a neck 102. Neck 102 may be a variety of shapes, styles and sizes to support the weight of a monitor and present the monitor to the user, while being adapted to be entirely stowed within armrest 14. For instance, neck 102 may be a cylindrical shaft as illustrated in FIG. 1, while other examples include non-cylindrical shafts. Distal end 110 of neck assembly 56 may include adapter 112 to secure upper arm assembly 16 to neck 102. As shown in FIG. 1, adapter 112 may be a socket and include socket fastener holes 114. In some examples, a shaft sheath 118 is positioned between neck assembly 56 and upper arm assembly 16. Shaft sheath 118 may include a flanged lip that is generally configured to mate with a lip of adapter 112.

FIG. 1 shows upper arm assembly 16 having an upper arm body 20 and a monitor support 120. As illustrated, upper arm body 20 includes a generally concave body having neck mating end 130 on its proximate side to receive and/or secure upper arm body 20 to neck assembly 56. In particular examples of upper arm body 20, the neck mating end 130 is sized to receive shaft sheath 118 between upper arm body 20 and neck assembly 56. Monitor support 120 may be a rigid panel in variety of shapes, styles and sizes to support the weight of a monitor in both a stowed position and the presentation position. Typically, monitor support 120 includes monitor fastener holes 122 aligned with a monitor assembly. Monitor fasteners 124 may fasten the monitor and/or monitor assembly to monitor support 120. Further, as illustrated in FIG. 1, monitor support 120 may include neck 126 to help position the monitor in an ideal viewing position during use, i.e. after the monitor presenter has been presented. Neck 126 may be a variety of shapes, styles and sizes for the convenience of the user and to support the weight of the monitor assembly.

Typically, a retainer secures upper arm body 20 to the neck assembly 56. As shown in FIG. 1, one example of the retainer is limiter swivel retainer 140. Limiter swivel retainer 140 may include a depressed socket 142 that is generally sized to fit within upper arm body 20 and be fastened to adapter 112 with socket fasteners 144. Washer 152 may be positioned between swivel retainer 140 and adapter 112. In particular examples, a retainer hat 146 may be secured to the distal end of upper arm body 20 to enclose swivel retainer 140. As indicated in FIG. 1, retainer hat 146 may include a fin generally sized and shaped to mate with upper arm body 20. Retainer hat 146 may include a upper arm retaining hole 148, for instance on the fin as shown in FIG. 1, that is aligned with a mirroring retaining hole on upper arm body 20. An upper arm fastener 150 may be used to fasten retainer hat 146 and upper arm body 20 in the respective retaining holes. Finally, the distal end of retainer hat 146 may be closed to further enclose upper arm body 20.

Figure 2:
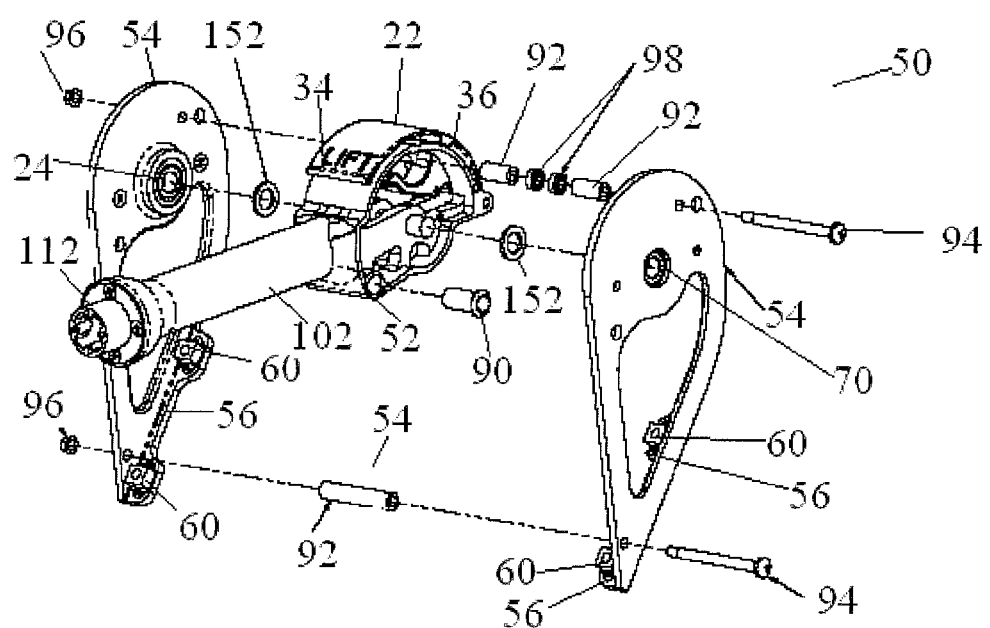
FIG. 2 is a side perspective, exploded view of elements of a monitor presenter according to the monitor apparatus embodiment of FIG. 1, with elements partially broken away and removed to show internal components.

FIG. 2 shows one embodiment of a monitor presenter having a lift latch and a neck assembly extension secured between plate assembly 50. Typically, plate assembly 50 includes a pair of mirroring side plates 54. As best seen in FIG. 2, the inner face of side plate 54 may include a locking plate lip 56 to mate with armrest 14. Each locking plate lip 56 may include a locking plate hole 62 and at least one, including a pair, of locking plates 60 to fasten plate assembly 50 to armrest 14 and/or seat assembly 12. Some embodiments of locking plates 60 are floating locking plates. Typically, locking plate lugs 64 protrude through locking plate hole 62 into locking plate lip 56 to securely fasten locking plates 60 and armrest 14. Other embodiments of side plates 54 include a variety of shapes, styles and sizes to fasten plate assembly 50 to armrest 14 and/or seat assembly 12.

As introduced in FIG. 2, one side plate 54 may secure a rotational dampener, while the mirroring side plate 54 supports and encloses the unit. Depending on the left/right starting orientation to present the monitor, i.e. from armrest 14 as discussed hereinafter, either the right side plate 54, left side plate 54 or a combination thereof may house and secure a rotational dampener. For instance, as seen in FIG. 2, the left side plate 54 houses rotational dampener 24 and the mirroring right side plate 54 includes dampener cavity 70 to receive and secure the opposing end of the dampener assembly. Washers 152 may be positioned between side plates 54 and the presenter body 52.

A spacer assembly 54 may space the mirroring side plates 54 between the lift latch and a neck assembly extension. Spacer assembly 54 may include a spacer sleeve 92 between the lower portions of side plates 54. As indicated in FIG. 2, spacer fastener 94, or the like, may be used to secure spacer sleeve 92 between the mirroring side plates 54. Similarly, another spacer sleeve 92 may be positioned between the upper portions of side plates 54. As shown, multiple spacer sleeves 92 may be positioned between the plates and may include multiple spacer ball bearings 98. Another spacer fastener 94, or the like, may pass through spacer sleeve 92 and spacer ball bearings 98 to secure spacer assembly 54 with a spacer nut 96 between the mirroring side plates 54.

FIG. 2 additionally introduces internal components of lift latch 22, presenter body 52 and associated neck assembly 56 extensions. Typically, presenter body 52 includes a lift latch 22 having handle 34 on the operational distal end with an opposing tail end 36 fastened to presenter body 52. Further, presenter body 52 may include a spring plunger 90.

Figure 3:
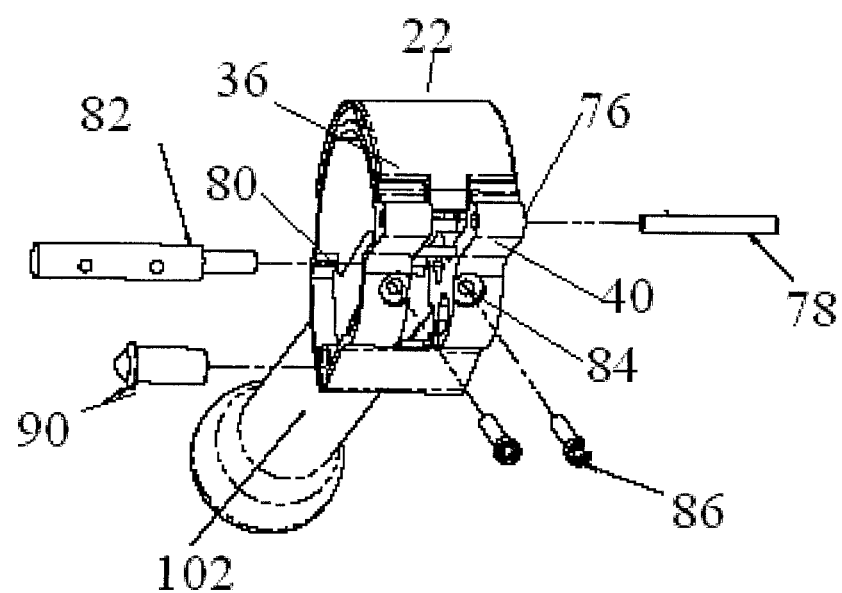
FIG. 3 is an isolated rear perspective, exploded view of elements of the monitor presenter according to the embodiment of FIG. 2.

FIG. 3 shows a rear view of isolated elements of presenter body 52 and neck 102. Typically, lift latch 22 has a tail end 36, which is rotatably latched to presenter body 52. In particular examples, presenter body 52 includes dowel pin 78 protruding through dowel pin openings 76. Similarly, shaft 82 may protrude through shaft cavity 80 in presenter body 52 to secure side plates 54. In one exemplary embodiment, shaft 82 is about a six millimeter in diameter linear shaft. Other shafts may be a variety of sizes and dimensions. Presenter body 52 may additionally include neck assembly holes 84, through which neck fasteners 86 protrude and fasten presenter body 52 to neck assembly 56.

Figure 4:
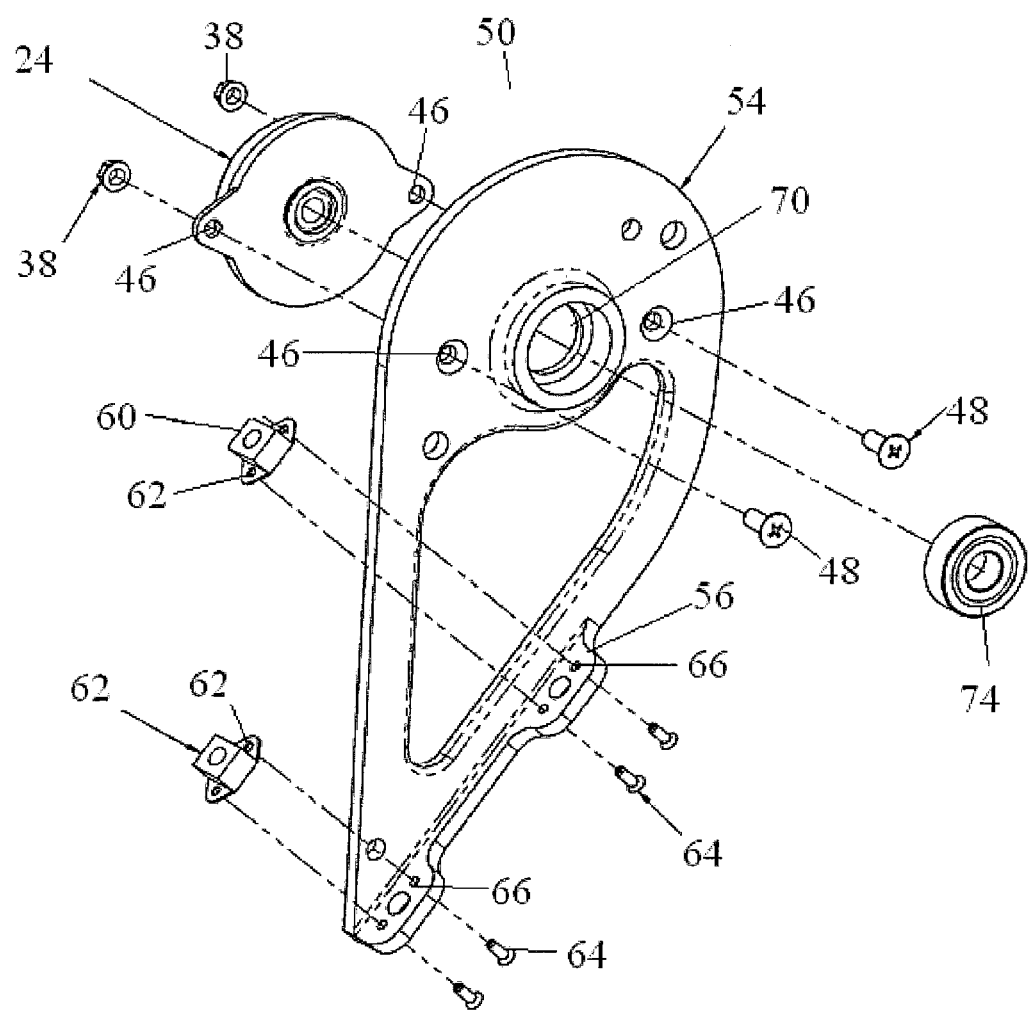
FIG. 4 is a side perspective, exploded view of isolated elements of a rotational dampener and plate assembly presenter according to the embodiment of FIG. 2.

As seen in FIG. 4, one embodiment of plate assembly 50 includes a side plate 54 having locking plate lip 56, dampener cavity 70 and a plurality of holes to secure together the mirroring plates and fasten plate assembly 50 to armrest 14. As shown, rotational dampener 24 is affixed to the outer face of side plate 54. Typically, rotational dampener 24 includes a surface having dampener retainer holes 46 to mate with side plate 54. As illustrated, dampener fasteners 48 may protrude through dampener retainer holes 46 within both rotational dampener 24 and side plate 54 to fasten rotational dampener 24 and side plate 54. Nut 38 may further secure dampener fasteners 48. As further seen in FIG. 4, ball bearing 74 may be sized to fit within dampener cavity 70. Shaft 82 may protrude through ball bearing 74, dampener cavity 70 and mate with rotational dampener 24.

Additionally, locking plate lip 56 may include a locking plate hole 62 and at least one, including a pair, of locking plates 60 to fasten plate assembly 50 to armrest 14 and/or seat assembly 12. Some embodiments of locking plates 60 are floating locking plates. Typically, locking plate lugs 64 protrude through locking plate hole 62 into locking plate lip 56 to fasten locking plates 60 and armrest 14.

Figure 5A:
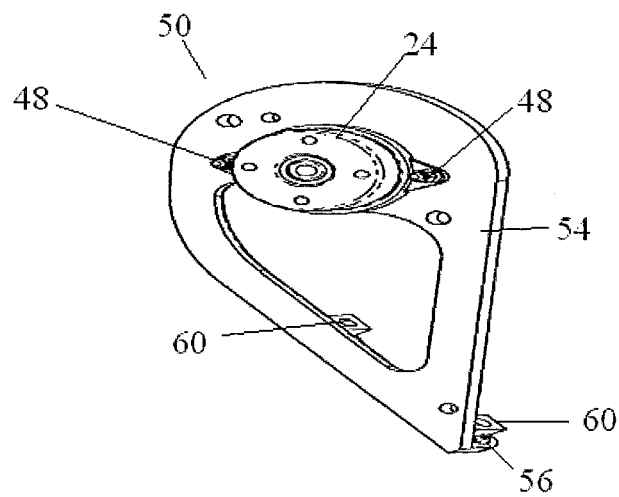
FIG. 5A is a side perspective view of the rotational dampener and plate assembly introduced in FIG. 4.
Figure 5B:
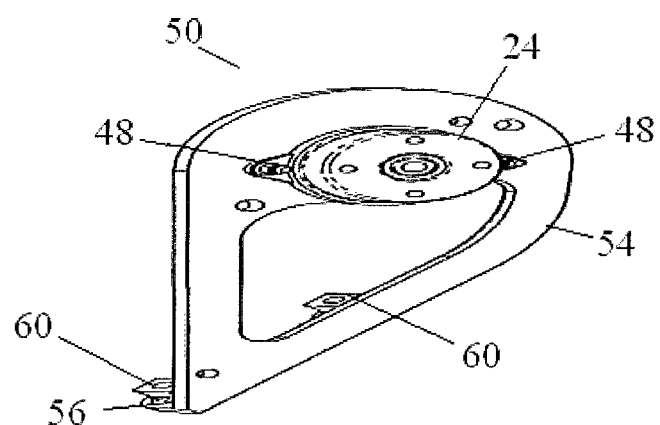
FIG. 5B is an opposing side perspective view of a rotational dampener and plate assembly shown in FIG. 4.

FIGS. 5A and 5B illustrate two examples of plate assembly 50 having rotational dampener 24 affixed to the outer face of side plate 54. As shown, dampener fasteners 48 fasten rotational dampener 24 to the respective outer faces of side plates 54. Typically, rotational dampener 24 is a rotary dampener that utilizes fluid resistance to dampen movement of the monitor presenter. In some exemplary embodiments, oil viscosity is utilized to provide the slow-release braking force of rotational dampener 24 to produce the delayed presentation the monitor presenter of in-arm monitor seat 10. The slow-release delay may be advantageous when presenting the monitor presenter to a user in a seat assembly. In particular, the slow-release delay from the rotational dampener may be advantageous wherein safety, for instance avoiding, or eliminating, abrupt force and/or startling concerns while presenting a monitor are of interest. The torque of the rotational dampener 24 varies according to the weight of the monitor, size of the armrest and the like. Particular embodiments of rotational dampener 24 include rotary dampeners available from ACE Controls, including DT-47A and 57A Series rotary dampeners and the like, the hydraulic dampener catalogue of which is incorporated herein by reference. Other embodiments of plate assembly 50 include a variety of other rotary and rotational dampeners discussed and referenced herein.

Figure 6A:
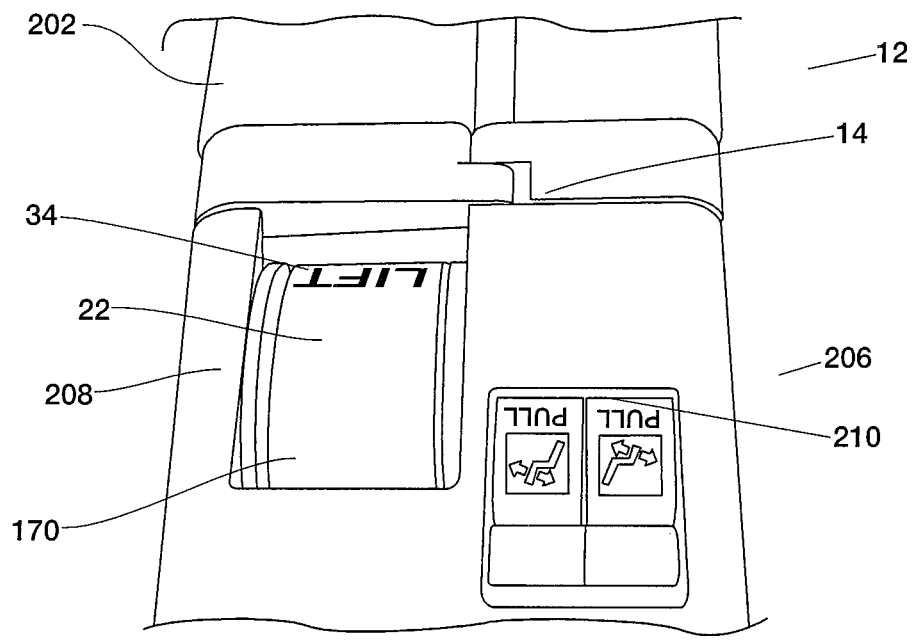
FIG. 6A is a top perspective view of one embodiment of a seat assembly and controls according to the inventions.
Figure 6B:
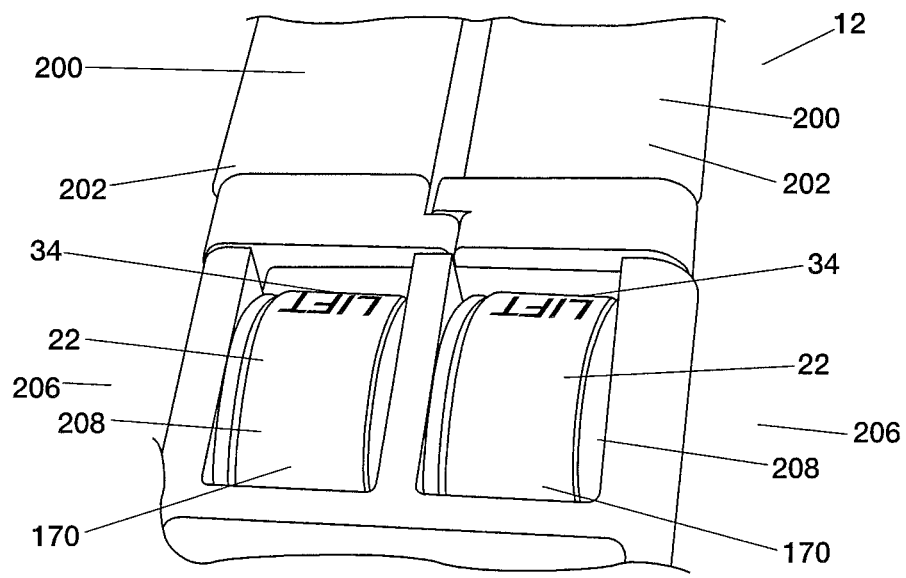
FIG. 6B is a top perspective view of another embodiment of a seat assembly and controls according to the inventions.
Figure 7:
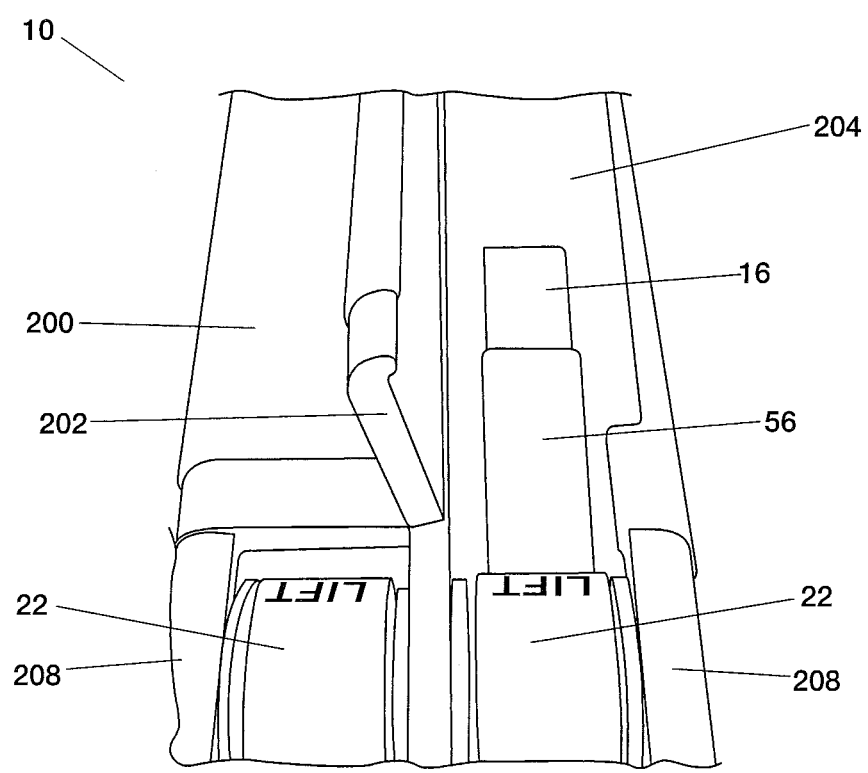
FIG. 7 is a top perspective view of an embodiment of a seat assembly and controls according to the inventions.

As seen in FIG. 6A, the armrest 14 of seat assembly 12 may include controls 206 on the upper surface of armrest 14. For instance, controls 206 may include monitor presenter control 208 to control the monitor presenter and/or a seat adjustment control 210 to control the seat adjustment of seat assembly 12. FIG. 6A illustrates one example of armrest 14 having a left side monitor presenter control 208 with lift latch 22. FIG. 6B illustrates another embodiment of armrest 14 of seat assembly 12 having both a left side monitor presenter control 208 for the seat to the right of the armrest, and a right side monitor presenter control 208 for the seat to the left of the armrest. Other embodiments include similar arrangements of controls and monitor presenter orientations as discussed hereinafter. Further, FIGS. 6A and 6B introduce the removable top 202 of the top surface 200 of armrest 14.

In various embodiments, the seat assembly 12 may include one or a plurality, including two or more, removable tops 202 that house the various monitor presenter elements described herein. In some examples, the seat assembly 12 may have an armrest 14 with a single removable top 202. Typically, the upper surface 200 of armrest 14 includes the removable top 202 to conceal the monitor presenter in the stowed position. In some examples, removable top 202 may be closed in the stowage position and also re-closed while the monitor is in use, i.e. removable top 202 may be re-closed after the monitor presenter has been presented.

In yet other embodiments, the seat assembly 12 may have an armrest with two removable tops 202, i.e. one for a first seat and one for an adjacent second seat. The removable top 202 may be hingedly, or the like, secured to armrest 14 to expose storage cavity 204 in the opened position. Typically, neck assembly 56 is parallel to armrest surface 200 in the stowed position. However, other embodiments include neck assembly 56 being stowed in a variety of positions within storage cavity 204. Additionally, upper arm assembly 16 may be partially visible to the user in the stowed position, for instance for recognition of the intended use of controls 208 to present the monitor presenter.

Typically, the monitor presenter controls 208 control the positioning of the assembly between a storage position and a presented position, and then from a presented position to the storage position. Further, the monitor presenter controls 208 may control the positioning of the assembly in the presented position. In some examples, the lift latch 22 is positioned between an armrest safety plate and latch cavity 170. Typically, the clearance between lift latch 22 and latch cavity 170 is sized to swivel handle 34 over itself into latch cavity 170, particularly without contacting armrest 14. In an exemplary embodiment, handle 34 may swivel into latch cavity 170 in a single, uninterrupted motion.

Figure 8:
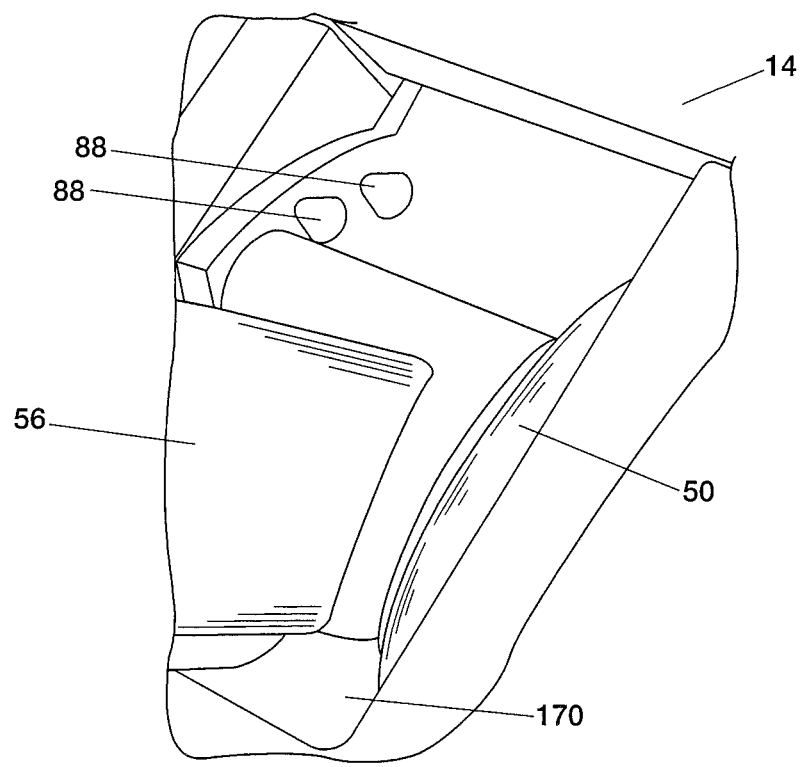
FIG. 8 is an enlarged top perspective view of an embodiment of an armrest and monitor presenter isolated in a presented position according to one embodiment of the inventions.

FIG. 8 shows one example of neck assembly 56 and plate assembly 50 in a fully presented position. Typically, plate assembly 50 may include an angle alignment hole 88 to position neck assembly 56 substantially vertical to armrest 14 in the presented position. As shown, plate assembly 50 may include a plurality of angle alignment holes 88, which neck assembly 56, or the like, may engage for multiple viewing angle position options. Therefore, neck assembly 56 may be substantially perpendicular to armrest 14 in the presented position, but neck assembly 56 may also be angled and secured in angle alignment holes, for example to match the pitch of a reclined seat or the like. Further, the lift latch 22 is configured to swivel into latch cavity 179, and thereby be substantially out of view in the presented position.

In a vertical presentation position, the removable top 202 is rotated into the open position thereby exposing latch springs 172, as discussed hereinafter. Typically, removable top 202 may be rotated back into a closed position once the monitor presenter is in the presentation position to conceal and close storage cavity 204.

FIG. 9 illustrates one exemplary embodiment of seat assembly 12 with the monitor 400 secured on the monitor presenter partially presented. As shown, neck assembly 56 is released from stowage in the storage cavity 204 and is partially rotated away from seat back 30. In this embodiment, armrest 14 includes two monitor presenter assemblies, i.e. one assembly for each adjacent seat, with only the left monitor presenter being partially presented in this particular view. In exemplary embodiments, once the monitor presenter has been presented, i.e. after removable top 200 has been hinged open, after the monitor presenter has been removed from storage cavity 204 and swiveled into a substantially parallel position with the seat back, the user may complete the fully presented position by locking the monitor apparatus 10 into a viewing position as discussed above.

Figure 10:
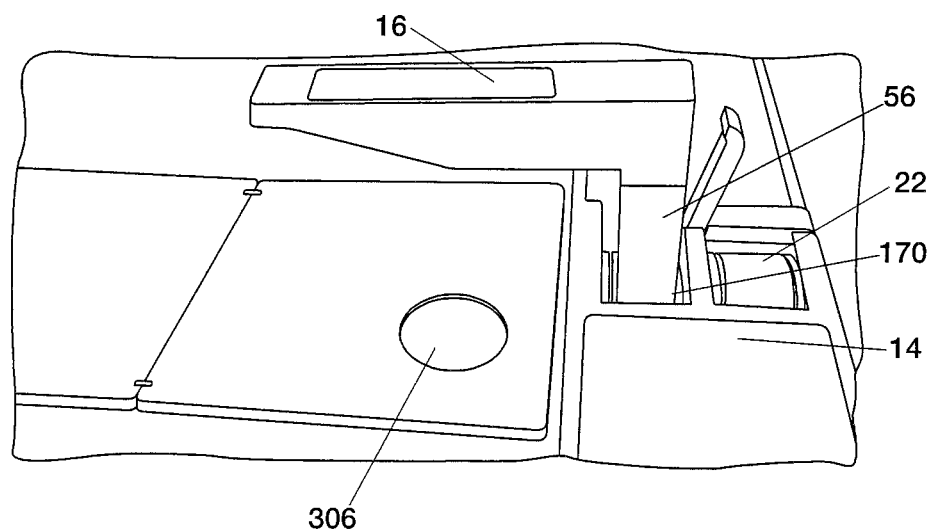
FIG. 10 is a front overview perspective of a seat assembly and aircraft passenger monitor apparatus in a presented position according to one embodiment of the inventions.

FIG. 10 shows one example of the monitor presenter in a fully presented position. As shown, upper arm assembly 16 is substantially parallel to the seat back. Further, the upper arm assembly 16 is sufficiently spaced from tray table 306 to allow access to tray table 306. Other embodiments include a variety of spacing orientations between upper arm assembly 16 and tray table 306. In the presented position, the lift latch 22 may be swiveled into latch cavity 170 and thereby be substantially out of view in the presented position.

Figure 11:
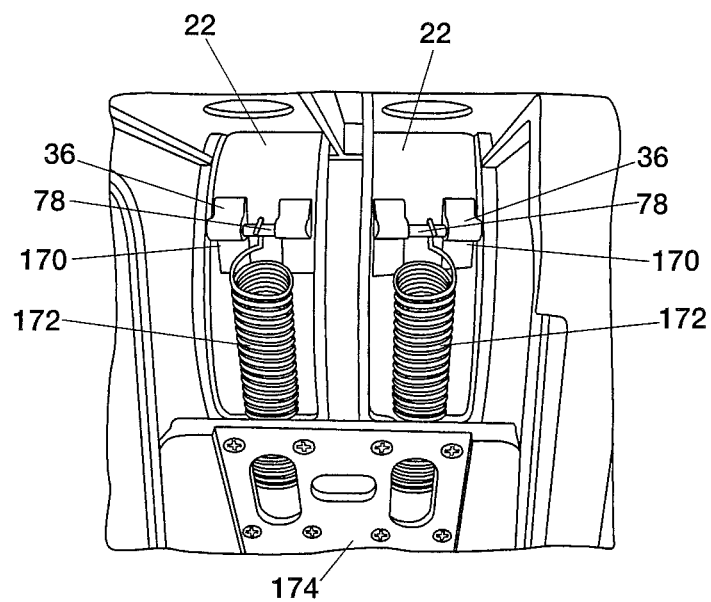
FIG. 11 is an isolated front perspective view of elements of the monitor presenter according to one embodiment of the inventions.

FIG. 11 illustrates one example of a lift latch assembly with elements removed to show internal components. As shown, latch spring 172 is secured between a pin of the support body and the armrest assembly. The latch spring 172 may include a variety of compression springs having a numerous spring constants, depending on the weight of the monitor and the like. Further, a safety plate 174 may be secured to armrest 14 to help conceal and protect latch spring 172.

Figure 12:
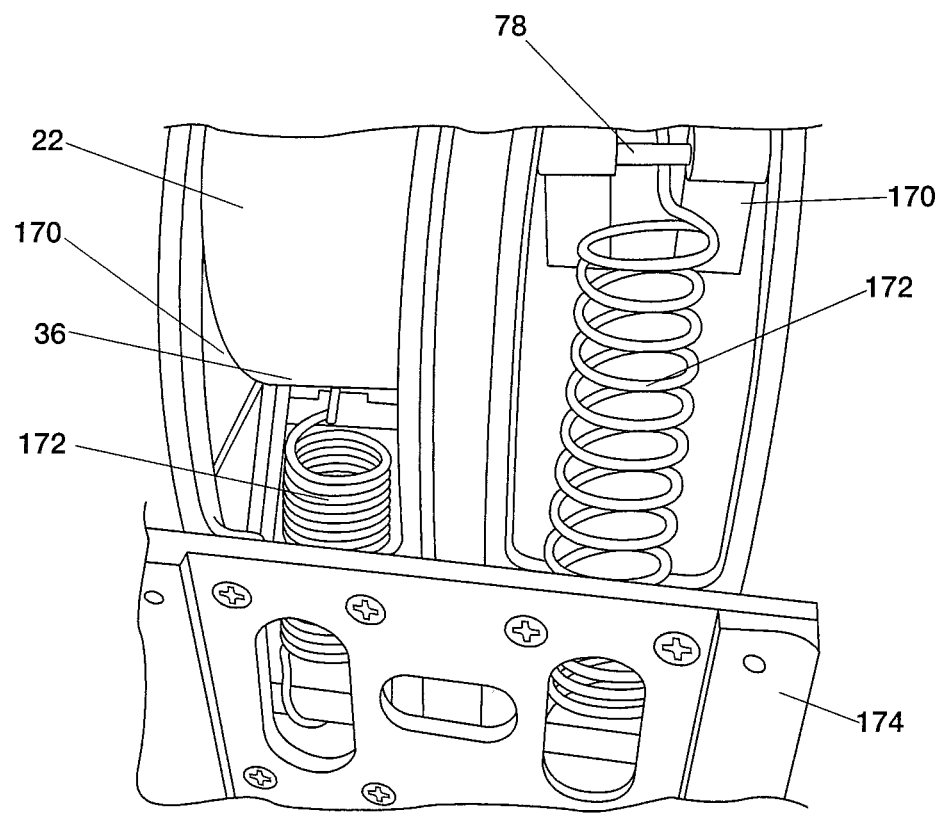
FIG. 12 is an enlarged front perspective view of isolated elements of the monitor presenter according to one example of the inventions, with the lift latch being secured in the latch cavity in a presented position.

FIG. 12 shows one particular embodiment, where during use in a presented position, the tail end 36 of the latch is typically swiveled down compressing latch spring 172 and retaining the latch assembly in a viewing position, i.e. after the monitor presenter has been presented. In particular embodiments, during non-use, the aircraft passenger monitor may be positioned into the stowed position. For example, to close the apparatus into the non-use position, the user may swivel the upper arm assembly 16 substantially parallel to armrest 14 and then release the tension in latch spring 172 by the rotating neck assembly 56 down into storage cavity 204.

In yet other embodiments, the inventions include an aircraft passenger monitor apparatus kit. In these embodiments, the kit may comprise a monitor presenter, e.g. any of the lift latches 22, upper arm assemblies 16 and rotational dampeners 24 previously shown or described. Further, the kit may include a monitor 400 or the like. Most typically, each kit may be a retrofit or renovate kit and including any of the elements previously shown or described.

Examples of aircraft components useful in embodiments herein are described in U.S. Pat. No. 7,410,127 (Seat Track Anti-Rattle Locking Device), issued Aug. 12, 2008 and U.S. Pat. No. 7,004,331 (Seat Recline Control Override), issued Feb. 27, 2007, both of which are incorporated herein by reference in their entireties.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

We claim:

1. An aircraft passenger monitor apparatus for presenting and stowing a monitor, the apparatus comprising:
   (a) a seat assembly having an armrest with a top surface;
   (b) a monitor presenter adapted to present the monitor from the armrest at a slow-release delay presentation, wherein the monitor presenter having a lift latch on the top surface of the armrest and a latch spring connected to a rotational dampener, wherein the rotational dampener is secured between a pair of opposing side plates;
   (c) an upper arm assembly connected to the monitor presenter and adapted to rotate the monitor from substantially ninety degrees from a storage position within the armrest to a presentation position above the armrest; and
   (d) a spacer sleeve secured between the pair of opposing side plates.

2. The apparatus of claim 1, wherein the armrest includes a seat adjustment control and a monitor presenter control.

3. The apparatus of claim 1, including an upper armrest surface having a removable top.

4. In an aircraft seat having an armrest with a top surface, a monitor presenter for presenting and stowing a monitor in the armrest, the monitor presenter comprising:
   a. a lift latch having an ergonomic handle on the top surface of the armrest and a latch spring connected to an under surface of the armrest; and
   b. a rotational dampener in communication with the lift latch and having a dampener retainer hole to mate the rotational dampener with a side plate to present the monitor substantially ninety degrees from the stowage position in the armrest.

5. The apparatus of claim 4, wherein the handle is adapted to present the monitor with a single uninterrupted motion.

6. The apparatus of claim 4, including a latch cavity, wherein the lift latch is adapted to swivel into the latch cavity in a presented position.

7. The apparatus of claim 4, wherein the latch spring being adapted to secure the lift latch in the latch cavity substantially out of view in the presented position.

8. The apparatus of claim 4, wherein the rotational dampener includes a fluid resistance adapted to present the monitor from the armrest at a slow release delay from the stowed position.

9. The apparatus of claim 4, wherein the side plate includes a locking plate lip.

10. The apparatus of claim 9, wherein the side plate includes at least one locking plate.

11. The apparatus of claim 9, wherein the side plate includes a dampener cavity.

12. The apparatus of claim 11, including a ball bearing within the dampener cavity between the side plates.

13. The apparatus of claim 4, wherein the monitor presenter includes a support body aligning the lift latch and the rotational dampener.

14. The apparatus of claim 13, wherein the support body includes a shaft cavity and a shaft protruding through the shaft cavity.

15. The apparatus of claim 13, including a spring plunger protruding through the support body.

16. The apparatus of claim 4, further including a spacer sleeve aligned between a pair of opposing side plates.

17. The apparatus of claim 4, further including a neck support end secured to the armrest.

18. The apparatus of claim 17, wherein the neck is adapted to extend the monitor from the armrest.

19. The apparatus of claim 4, further including a neck support end secured to the armrest.

20. The apparatus of claim 19, wherein the presentation position is substantially parallel to the seat back.

21. The apparatus of claim 19, wherein the monitor presenter includes a monitor support body.

22. The apparatus of claim 21, wherein the monitor support body includes an elbow having a plurality of monitor viewing angle alignment holes.

23. The apparatus of claim 21, wherein the monitor presenter includes a limiter swivel retainer positioned between the upper arm and the neck support end.

24. The apparatus of claim 23, wherein the limiter swivel retainer includes a socket.

25. The apparatus of claim 24, wherein the limiter swivel retainer includes a fastener to fasten the socket and the monitor support.

26. The apparatus of claim 23, wherein the limiter swivel retainer includes a retainer hat.

27. The apparatus of claim 26, wherein the retainer hat includes an upper arm hole and an upper arm fastener to fasten the retainer hat and the upper arm assembly.

* * * * *